United States Patent [19]

Linder et al.

[11] 4,144,212

[45] Mar. 13, 1979

[54] AIR-CURING COPOLYMER LATICES

[75] Inventors: Seymour M. Linder, Baltimore; John W. Calentine, Pasadena, both of Md.

[73] Assignee: Alcolac Inc., Baltimore, Md.

[21] Appl. No.: 883,505

[22] Filed: Mar. 6, 1978

[51] Int. Cl.$^2$ .......................................... C08F 220/40
[52] U.S. Cl. .................... 260/29.7 H; 260/29.7 T; 526/282
[58] Field of Search ................. 260/29.7 R, 29.7 H, 260/29.7 T; 526/282

[56] References Cited

U.S. PATENT DOCUMENTS

| | | | |
|---|---|---|---|
| 2,395,452 | 2/1946 | Bruson | 260/23.7 C |
| 2,414,089 | 1/1947 | Bruson | 560/256 |
| 2,454,743 | 11/1948 | Mowry | 526/282 |
| 2,462,400 | 2/1949 | Hoover | 526/232.1 |
| 3,772,062 | 11/1973 | Shur | 260/837 R |
| 4,071,489 | 1/1978 | Emmons | 260/22 CB |

*Primary Examiner*—Paul R. Michl
*Attorney, Agent, or Firm*—George L. Tone

[57] ABSTRACT

Air-curing copolymer latices are described. The preferred copolymer latices are prepared by emulsion copolymerization, in the presence of a free radical polymerization catalyst such as inorganic or organic peroxide polymerization catalysts, with a blend (in % by weight based on the total weight of all monomers used) of (a) about 1% to about 20% of dicyclopentadienyl acrylate or dicyclopentadienyl methacrylate, (b) about 99% to about 20% of an alkyl acrylate or methacrylate, including mixtures of such monomers, and preferably a lower alkyl acrylate or methacrylate in which the alkyl groups contain from 1 to 4 carbon atoms, (c) 0% to about 5% of acrylic acid or methacrylic acid, and (d) 0% to about 85% of other monoethylenically unsaturated copolymerizable monomers. As examples of other copolymerizable monomers which may be used as component (d) may be mentioned: higher alkyl acrylates and methacrylates in which the alkyl groups contain from 5 to about 18 carbon atoms, acrylamide, methacrylamide, acrylonitrile or methacrylonitrile; also vinyl esters (e.g. vinyl acetate, vinyl propionate of vinyl chloride), styrene and alkyl vinyl ethers. The novel air-curing latices of the present invention are particularly suitable for use in paints and other coating applications since the films obtained therefrom continue to cure on standing in air, as evidenced by a marked increase in their resistance to solvents, such as methyl ethyl ketone. The cure can be accelerated to a significant degree by heating the films and/or by incorporating a few percent of a drying agent in the latex.

8 Claims, No Drawings

AIR-CURING COPOLYMER LATICES

The present invention relates to new and improved air curing acrylic copolymer latices comprising an aqueous emulsion or dispersion of an acrylic copolymer obtained by emulsion copolymerization of (a) a minor proportion of dicyclopentadienyl acrylate and/or dicyclopentadienyl methacrylate with (b) a major proportion of one or several alkyl esters of $\alpha, \beta$ ethylenically unsaturated carboxylic acids, usually alkyl acrylates and/or alkyl methacrylates, usually (c) also a minor proportion of acrylic acid or methacrylic acid, and possibly (d) a minor to major proportion of other copolymerizable comonomers such as vinyl acetate or styrene, etc.

BACKGROUND OF THE INVENTION

Acrylic and vinyl/acrylic copolymer latices are well known in the art and have found extensive use in the coating, paint and analogous arts, see for example the Kirk-Othmer, Encyclopedia of Chemical Technology, 2nd Edition, Vol. 14, pages 468–470, Interscience Publishers, New York (1967). In general, the coating or paint film obtained by the use of the usual acrylic copolymer latex is dried by evaporation of the water and further curing or hardening of the film does not take place following evaporation of the water.

Dicyclopentadienyl esters of carboxylic acids were first described in U.S. Pat. No. 2,395,452 of Herman A. Bruson issued Feb. 26, 1946 and the dicyclopentadienyl esters of unsaturated fatty acids are more fully and specifically described in U.S. Pat. No. 2,414,089 of Herman A. Bruson issued Jan. 14, 1947 on a continuation-in-part of the application for said 2,395,452 patent. In U.S. Pat. No. 2,414,089, Bruson characterizes the esters of his patent as "polymerizable, autoxidizable compounds which absorb oxygen from the air to form tough, hard, solvent-insoluble compositions. They are particularly useful as coating materials, serving in this respect as drying oils which have been modified with resins." (Col. 1, lines 27–32). Dicyclopentadienyl methacrylate is described in Example 8 (Col. 6, lines 25–49) of the patent as as a colorless oil which boiled at 126°–133° C./8 mm and dicyclopentadienyl acrylate is described in Example 9 (Col. 6, lines 50–61) as a colorless oil which boiled at 116°–122° C./3–5 mm. In Example 3 (Col. 5, lines 7–18) of the patent Bruson describes the preparation of the dicyclopentadienyl ester of linseed oil fatty acids and at Col. 6, lines 62–75 states that a sample of dicyclopentadienyl linoleate, as obtained in Example 3, as mixed with lead, cobalt and manganese naphthenates as a siccative and "A film of this mixture was then formed on a steel panel which was then baked for an hour at 150° C. to form a hard, tough, adherent, varnish-like coating. In a similar manner, other unsaturated fatty acid esters of hydroxydihydronordicyclopentadiene and oleic, undecylenic, clupanodonic, elaidic, eleostearic or licanic acids, for example give varnish-like coatings."

More recently the admixture of monomeric dicyclopentadienyl acrylate and/or dicyclopentadienyl methacrylate with other resins and the use of such mixtures as curable coating compositions and paints has been suggested. U.S. Pat. No. 3,772,062 of E. G. Shur and R. Dabal, issued Nov. 13, 1973 discloses an ultra-violet curable coating composition comprising a blend of (a) The diacrylate of an epichlorohydrin-bisphenol-A epoxy resin, (b) neopentyl glycol diacrylate, (c) hydroxyethyl acrylate, (d) dicyclopentadienyl acrylate and (e) a photosensitizer. This composition is coated on a substrate and the coating cured by exposure to ultra-violet irradiation. Belgian Pat. No. 852,180 of Sept. 7, 1977 to Rohm and Haas Company (U.S. priority applications Ser. Nos. 664,597 and 665,017 filed Mar. 8, 1976 in the name of W. D. Emmons, K. Nyi and P. R. Sperry) discloses coating compositions and paints which comprise a mixture of (a) an aqueous solution or dispersion of a vinyl addition polymer, (b) 1–200% by weight based on such vinyl addition polymer, of dicyclopentadienyl acrylate or dicyclopentadienyl methacrylate, and (c) a drying agent. Films deposited on test panels were cured by drying for several weeks at ambient conditions. Belgian Pat. No. 842,181 of Sept. 7, 1977 to Rohm and Haas Company (U.S. priority applications Ser. Nos. 664,597 and 665,017, filed Mar. 8, 1976 in the name of W. D. Emmons, K. Nyi and P. R. Sperry) discloses coating compositions and paints which comprise a solution or dispersion in (a) dicyclopentadienyl acrylate or dicyclopentadienyl methacrylate, which may have dissolved or dispersed therein a minor proportion of at least one other liquid, non-volatile, monoethylenically unsaturated monomer; of (b) a polyester or alkyd resin which contain unsaturated groups derived from (i) fumaric acid or maleic acid or anhydride or (ii) drying or semi-drying oils. If desired such compositions may be dispersed or emulsified in water. Films deposited on test panels were cured by drying in air for several weeks, at ambient temperatures, to give hard, durable films not susceptible to crazing, shrinkage or deformation and having improved resistance to yellowing and discoloration, solvents, alkalis, weathering, UV and other radiation.

While in the foregoing coating and paint compositions, the dicyclopentadienyl acrylate or dicyclopentadienyl methacrylate was used in its monomeric form; U.S. Pat. No. 2,462,400, issued Feb. 22, 1949 to Fred W. Hoover (duPont) discloses copolymers containing from 20 to 50% of dicyclopentadienyl methacrylate and from 80 to 50% of an ester of methacrylic acid with a saturated aliphatic monohydric alcohol having from 8 to 18 carbon atoms; and coating compositions comprising a solution in an aromatic organic, preferably hydrocarbon, solvent of such copolymers as the essential film-forming ingredient; the coating compositions of this patent also preferably contain a small amount of a drying agent. In the patent, coatings, (films) were formed by flowing the coating solution on steel panels and allowing the coatings to air dry. The coating films so obtained were initially tacky but became tackfree after about 10 hours (after the solvent had evaporated) and developed moderate resistance to xylene after 24 hours. At Col. 3, line 54 to Col. 4, line 4 of this patent, the patentee states:

"The copolymers of this invention are of outstanding utility for use in coating compositions in that they yield films which, upon air drying, are highly resistant to solvents and alkalis and yet exhibit excellent toughness and flexibility. It is to be noted that products having these characteristics are obtained only when the polymerization is carried out under certain specific conditions. For example, it is essential that the monomer contain from 20 to 50% of dihyrodicyclopentadienyl methacrylate and from 80 to 50% of an ester of methacrylic acid with a saturated aliphatic alcohol of 8 to 18 carbon atoms. Use of appreciably more than 50% of dihydrodicyclopentadienyl methacrylate results in copolymers which are brittle and field films of inferior flexibility. Use of monomer mixtures containing more than 80% of a methacrylate of an alkanol having from 8 to 18 carbon atoms, on the other hand, results in soft copolymers which give films that mar so easily that they are of limited utility. As shown in Example I, copolymers derived from methacrylates of alkanols having less than 8 carbon atoms are unattractive for use in coating compositions since the resulting films are brittle." Continuing at Col. 4, lines 13-23, he states:

"The soluble, air-drying copolymers of this invention are obtained in substantially quantitative yield only when the polymerization is carried out in the presence of a solvent for dihydrodicyclopentadienyl methacrylate. Attempts to prepare these products in reasonably high conversion by conventional emulsion or bulk polymerization techniques have always resulted in insoluble, crosslinked products which are not suitable for use in coating compositions and other important applications."

SUMMARY OF THE INVENTION

It has now been found that conventional acrylic type latices, useful as coating and in paints, can be modified and air curing properties imparted thereto in accordance with the present invention, by incorporating a minor amount of dicyclopentadienyl acrylate and/or dicyclopentadienyl methacrylate as an air-curing comonomer in the acrylic monomer(s) customarily employed in the production of acrylic latices for use as coatings and for paints by conventional emulsion polymerization techniques using free radical polymerization catalysts.

The novel air-curing acrylic and vinyl-acrylic latex copolymers of this invention are thus copolymers of (a) a minor amount, less than 20% by weight of total monomers and preferably from about 3% to about 10% by weight of the total monomers, of dicyclopentadienyl acrylate and/or dicyclopentadienyl methacrylate with (b) from about 20% to about 99% by weight of the total monomers of one or several lower (1-4 carbon atom) alkyl esters of $\alpha, \beta$ ethylenically unsaturated carboxylic acids, (c) from 0 to about 5% by weight of the total monomers of acrylic and/or methacrylic acid, (d) 0% to about 40% of other acrylic type monomers such as higher alkyl acrylates or methacrylates in which the alkyl groups contain from 5 to 18 carbon atoms, acrylamide, methacrylamide, diacetone acrylamide, acrylonitrile or methacrylonitrile, and (e) from 0% to about 85% by weight of the total monomers of other copolymerizable comonomers such as vinyl acetate, styrene, vinyl chloride, vinyl propionate, alkyl vinyl ethers, etc. Such novel air-curing acrylic and vinyl acrylic latices can be prepared in essentially quantitative yield by copolymerization of a blend of the foregoing monomers, in the proportions specified, using conventional emulsion polymerization techniques and a free radical polymerization catalyst. Films prepared from such latices on test panels are tack-free following evaporation of the water and are initially essentially similar to, but somewhat harder than, the films obtained from similar latices obtained without the use of dicyclopentadienyl acrylate or dicyclopentadienyl methacrylate as an air-curing monomer. However, the films from the novel air-curing latices of the present invention will air cure on standing and thus develop markedly increased resistance to solvents. Under ambient conditions, such air cure, as evidenced by an increase in resistance to solvents, takes place over a period of several weeks, but can be accelerated to a significant degree by the addition of a drying agent to the latex and/or heating, e.g. to 60°-70° C., so as to be substantially complete in from 3-7 days at ambient temperatures or in several hours at 60°-70° C.

Dicyclopentadienyl acrylate and methacrylate (first called dihydronordicyclopentadienyl acrylate and methacrylate, U.S. Pat. No. 2,414,089 supra; and also referred to as dihydrodicyclopentadienyl methacrylate in U.S. Pat. No. 2,464,400 supra; and as dicyclopentenyl acrylate and methacrylate in U.S. Pat. No. 3,772,062 and Belgian Pat. Nos. 852,180 and 852,181 supra) may be represented by the following general formula:

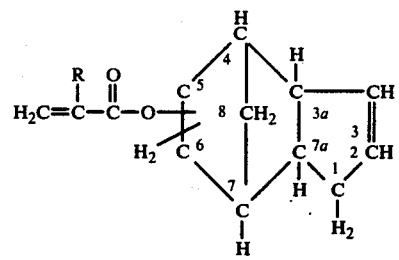

in which R is H or CH$_3$ and the acryloxy or methacryloxy group is in position 5 or 6, the commercial product being a mixture of these two isomers. Such isomeric mixtures are quite acceptable for use in practising the present invention and are preferred from a cost standpoint.

DESCRIPTION OF PREFERRED EMBODIMENTS

The details of the present invention will be apparent to those skilled in the art from a consideration of the following specific examples of preferred embodiments thereof

EXAMPLE 1

| | FORMULATION | |
|---|---|---|
| Material | Weight in grams | % by weight of total monomers |
| Butyl Acrylate | 287 | 50.5 |
| Methyl Methacrylate | 258 | 45.4 |
| Methacrylic Acid | 8.4 | 1.4 |
| active (1) dicyclopentadienyl Methacrylate (100% basis) | 15.44 | 2.7 |
| (Total weight of monomers) | 568.84 | 100.0 |

PROCEDURE

1. Blend the butyl acrylate, methyl methacrylate and methacrylic acid together, then divide into two equal portions. Prepare a solution of the surfactants in 168 g. of water, and divide it into two equal portions. Form a pre-emulsion by stirring one portion of the monomer blend into one portion of the surfactant solution with vigorous agitation under a nitrogen blanket and transfer this pre-emulsion to an addition funnel. Form a second pre-emulsion, just before needed, by stirring the dicyclopentadienyl methacrylate and the second portion of the monomer blend (butyl acrylate, methyl methacrylate and acrylic acid) into the second portion of the surfactant solution, while under a nitrogen blanket.

2. Prepare a solution of the sodium persulfate in 11.8 g. of water. Prepare a solution of the sodium metabisulfite in 56 g. of water and transfer it to an addition funnel.
3. Charge 146 g. of water into a stirred polymerization reactor. Purge the reactor and contents with nitrogen for 15–20 minutes then heat to 50° C.
4. When the reactor reaches 50° C., charge all the sodium persulfate solution to the reactor and 9 ml. of the sodium metabisulfite solution.
5. When the 9 ml. of sodium bisulfite solution has been charged, start the addition of the first pre-emulsion (containing no dicyclopentadienyl methacrylate) to the reactor while stirring and controlling the temperature of the polymerization to 58° ± 2° C. until all the first pre-emulsion has been added. When all the first portion of the pre-emulsion has been added, start the addition of the second portion of pre-emulsion (containing the dicyclopentadienyl methacrylate) while stirring and controlling the temperature at 58° ± 2° C. until all of the second portion of the preemulsifier has been added. Total addition time of both portions of preemulsions is 3½–4 hours.
6. During the addition of the pre-emulsions to the reactor, add, periodically or continuously, small amounts of the sodium metabisulfite solution to the reactor as needed and at such a rate that about 20% remains after all of both portions of the pre-emulsions have been added.
7. After all of both portions of the pre-emulsions have been charged to the reactor, add (over a 5–10 minute period) the remaining sodium metabisulfite solution and continue stirring and heating the latex to 58° ± 2° C. for an additional 45–60 minutes.
8. Cool and discharge the latex.

The thus obtained latex was the tetrapolymer of butyl acrylate, methyl methacrylate, methacrylic acid and dicyclopentadienyl methacrylate which contained (on a 100% active basis) about 2.7% of dicyclopentadienyl methacrylate based on the total weight of all monomers. It was stable on storage under nitrogen and had a solids content of about 60%. It is hereinafter referred to as Latex "Ex. 1".

EXAMPLE 2

The foregoing Example 1 was repeated except that 14.1 g. of 80% active dicyclopentadienyl methacrylate (11.3 g. on a 100% active basis) was used instead of the 19.3 g. (15.44 g. on a 100% active basis) of dicyclopentadienyl methacrylate used in Example 1. There was thus obtained a latex of the tetrapolymer of butyl acrylate, methyl methacrylate, methacrylic acid and dicyclopentadienyl methacrylate which contained about 2% of dicyclopentadienyl methacrylate based on the total weight of all monomers, but was otherwise similar to the latex obtained in Example 1. This latex is hereinafter identified as Latex "Ex. 2".

The thus obtained latices Ex. 1 and Ex. 2 were neutralized to pH 7 by the addition of ammonium hydroxide. Commercial drying agents (Cem-All, a drying agent from Mooney Chemicals, Inc., Cleveland, Ohio, containing 6% manganese or Hydro-Cure, a drying agent from Mooney Chemicals, Inc., Cleveland, Ohio containing 5% cobalt, were added to portions of both latices at a level of 3% based on resin solids, or 1.8 g. of drying agent per 100 g. of latex (60% solids). Sample films of the latices, both those containing 3% drying agent and those to which no drying agent had been added, were cast and the films air-cured under the temperature conditions given in the table below. The extent of curing was determined by observing the properties of samples of the films in MEK (methyl ethyl ketone). The results were as follows:

| Film No. | Curing Time | Temperature Conditions | Latex | Drying Agent | Film Properties in MEK |
|---|---|---|---|---|---|
| 1 | 30 min. | 20–25° C. | Ex. 1 | None | Cloudy Solution |
| 2 | 2 hrs. | 70° C. (oven) | Ex. 1 | Cem-All | Breaks up into large pieces on stirring - film integrity very good. |
| 3 | 3 days | 20–25° C. | Ex. 1 | Cem-All | Not as good as oven cure (2) film integrity fairly good |
| 4 | 7 days | 20–25° C. | Ex. 1 | Cem-All | Film integrity good |
| 5 | 2 hrs. | 70° C. | Ex. 1 | Hydro-Cure | Breaks up into large pieces on stirring - film integrity very good. |
| 6 | 3 days | 20–25° C. | Ex. 1 | Hydro-Cure | Not as good as 5 where oven cured, but film integrity fairly good |
| 7 | 7 days | 20–25° C. | Ex. 1 | Hydro-Cure | Comparable to oven cured film 5, film integrity very good better cure than film 4 |
| 8 | 30 min. | 20–25° C. | Ex. 2 | None | Cloudy solution |
| 9 | 60 hrs. | 20–25° C. | Ex. 2 | None | Film retains some integrity |
| 10 | 2 hrs. | 70° C. (oven) | Ex. 2 | None | Film retains fairly good integrity, breaks up into small pieces on stirring |
| 11 | 2 hrs. | 70° C. | Ex. 2 | Cem-All | Breaks into large pieces on stirring film integrity good |
| 12 | 3 days | 20–25° C. | Ex. 2 | Cem-All | Not as good as oven cured, film 11, but film integrity fairly good |
| 13 | 7 days | 20–25° C. | Ex. 2 | Cem-All | Film integrity good |
| 14 | 2 hrs. | 70° C. | Ex. 2 | Hydro-Cure | Breaks up into large pieces on stirring, |

-continued

| Film No. | Curing Time | Temperature Conditions | Latex Latex | Drying Agent | Film Properties in MEK |
|---|---|---|---|---|---|
| 15 | 3 days | 20-25° C. | Ex. 2 | Hydro-Cure | film integrity good Not as good as oven cured film 14, but film integrity fairly good |
| 16 | 7 days | 20-25° C. | Ex. 2 | Hydro-Cure | Comparable to oven cured film 14, film integrity very good and better than Cem-All cured film 13. |

All of the films above were flexible and clear with only a slight haze both before and after curing. Samples of like films kept in the dark for 8 days under ambient conditions (20°-25° C.) behaved in the same manner as those aircured in the light. Samples of films prepared from latices produced in the same manner as latices Ex. 1 and Ex. 2, except that no dicyclopentadienyl methacrylate was employed in the formulation, when aged under similar conditions were soluble in MEK.

EXAMPLE 3

FORMULATION

| Material | Weight in grams | % by weight total monomer |
|---|---|---|
| Butyl Acrylate | 255 | 49.7 |
| Methyl Methacrylate | 230 | 44.8 |
| Methacrylic Acid | 7.5 | 1.5 |
| Dicyclopentadienyl Methacrylate | 21 | 4.0 |
| (Total weight of Monomers) | 513.5 | 100.0) |
| Sodium Tridecyl Ether Sulfate (30% Active) | 29.3 | |
| Octylphenol Ethoxylate (70% Active) | 13.4 | |
| Sodium Persulfate | 1.25 | |
| Sodium Metabisulfite | 1.25 | |
| Water, deionized | 340 | |

PROCEDURE

1. Blend the butyl acrylate, methyl methacrylate, methacrylic acid and dicyclopentadienyl methacrylate together by stirring together under a nitrogen blanket. Prepare a solution of the surfactant emulsifier in 150 ml. of water. Form a pre-emulsion by stirring the monomer blend into the surfactant emulsifier solution with vigorous agitation under a nitrogen blanket. Transfer this pre-emulsion to an addition funnel.
2. To a 1 liter, stirred, polymerization reactor charge 150 ml. of water and the sodium persulfate and stir until solution.
3. Dissolve the sodium metabisulfite in the remaining water and transfer this solution to an addition funnel.
4. Purge the reactor with nitrogen and heat to 50° C.
5. When the reactor reaches 50° C., charge 5 ml. of the sodium metabisulfite solution.
6. When the 5 ml. of the sodium metabisulfite solution has been charged to the reactor, start the addition of the pre-emulsion to the reactor while stirring and holding the temperature at 60°-65° C. and adding sodium metabisulfite solution as needed.
7. When all of the pre-emulsion has been charged, in 3-3½ hours, add any remaining sodium metabisulfite solution and continue heating for an additional 30 minutes.
8. Cool and discharge the latex.

The thus obtained latex, of the tetrapolymer of butyl acrylate, methyl methacrylate, methacrylic acid and dicyclopentadienyl methacrylate, contained about 4% of dicyclopentadienyl methacrylate based on the total weight of all monomers. It was obtained in quantitative yield and was stable on storage under nitrogen and had a solids content of about 60%. It is hereinafter referred to as Latex "Ex. 3".

This latex was neutralized to pH 7 by the addition of ammonium hydroxide. Hydro-Cure was added to a portion of the latex as a drying agent at a level of 3% based on resin solids (1.8 g. of Hydro-Cure per 100 g. of latex). Films were prepared under nitrogen (to prevent premature curing). Samples of these films were then air-cured under the conditions given below and the extent of curing was determined by solubility of the cured film in MEK. The results were as follows:

| | Curing Time | Temperature Conditions | Latex | Drying Agent | % Insoluble |
|---|---|---|---|---|---|
| 17 | 25 hrs. | 20-25° C. | Ex. 3 | None | Microgel |
| 18 | 48 hrs. | 20-25° C. | Ex. 3 | None | Microgel |
| 19 | 120 hrs. | 20-25° C. | Ex. 3 | None | 56%-Minimum |
| 20 | 216 hrs. | 20-25° C. | Ex. 3 | None | 73% |
| 21 | 504 hrs. | 20-25° C. | Ex. 3 | None | 94% |
| 22 | 144 hrs. + 1 hr. | 20-25° C. 70° C. | Ex. 3 | None | 83% |
| 23 | 24 hrs. | 20-25° C. | Ex. 3 | Hydro Cure | 85% |
| 24 | 48 hrs. | 20-25° C. | Ex. 3 | Hydro Cure | 94% |
| 25 | 120 hrs. | 20-25° C. | Ex. 3 | Hydro Cure | 93% |

A sample of film containing no drying agent which was dried in a nitrogen atmosphere for 48 hours, formed a turbid solution (contained microgel) in MEK.

EXAMPLE 4

The following recipe and procedure describes the preparation of an allacrylic latex containing air curing monomer (14.9% per 100 monomers).

| Formulation | Weight in grams |
|---|---|
| Butyl acrylate | 290 |
| Methyl methacrylate | 185 |
| Methacrylic acid | 10.8 |
| Dicyclopentadienyl methacrylate (100% active) | 84.8 |
| Sodium Tridecyl Ether Sulfate (30%) | 32.6 |
| Octylphenol ethoxylate (70%) | 14.9 |
| Sodium persulfate | 1.4 |
| Sodium metabisulfite | 1.4 |
| Water, deionized | 375.3 |
| | 996.2 |

PROCEDURE (a) The butyl acrylate, methyl methacrylate, methacrylic acid, and dicyclopentadienyl methacrylate monomers are blended together under nitrogen.
(b) The sodium tridecyl ether sulfate and octylphenol ethoxylate are dissolved in 150 g. water.

(c) The monomer is stirred into the surfactant solution with vigorous agitation to form a pre-emulsion, under nitrogen.

(d) Prepare a solution of the sodium persulfate in 12 g. water and the sodium metabisulfite in 56 g. water, transfer each to an addition funnel.

(e) Charge 157.3 g. water into a stirred reactor. Purge reactor and contents with nitrogen for 15–20 minutes, then heat to 50° C.

(f) When reactor reaches 50° C., charge all the sodium persulfate solution to reactor and 9 ml of the sodium metabisulfite solution.

(g) When the sodium metabisulfite has been charged, start addition of the pre-emulsion. Total addition time of pre-emulsion is 3½–4 hours.

(h) Add the sodium metabisulfite solution, so that 20% remains for addition (over 5–10 minute period) after all the pre-emulsion has been charged.

(i) Polymerization temperature should be 58° ± 2° C.

(j) Heat latex an additional 45–60 minutes after pre-emulsion has been charged.

(k) Cool and discharge the latex, under nitrogen.

The latex has 58.8% solids and yields a clear film. The film is fairly brittle before air curing. The air cured film is flexible and insoluble in MEK.

EXAMPLE 5

The following recipe and procedure describes the preparation of a vinyl acetate-acrylic latex containing air curing monomer.

| Formulation | Weight in grams |
|---|---|
| Vinyl acetate | 770 |
| Butyl acrylate | 200 |
| Dicyclopentadienyl methacrylate (100% active) | 30 |
| Sodium salt of an alkyl ether sulfate (30%) | 72 |
| Octylphenol ethoxylate (70%) | 33.4 |
| Ammonium persulfate | 3.5 |
| Sodium metabisulfite | 3.0 |
| Sodium bicarbonate | 1.5 |
| Water, deionized | 809 |
| | 1922.4 |

PROCEDURE (a) Charge to a two liter spherical resin reactor 589 g. of water.

(b) Prepare solution of sodium alkyl ether sulfate and octylphenol ethoxylate in 120 g. water. Charge 24 g. of the surfactant solution to the reactor. To the remaining 201.4 g. surfactant solution add the sodium metabisulfite (c) Charge following solution to a 125 ml addition funnel:

| | | |
|---|---|---|
| 1) | Ammonium persulfate | 3.5 g |
| 2) | Sodium carbonate | 1.5 g |
| 3) | Water | 100 g |

(d) Charge to a one liter addition funnel:
  (1) Vinyl acetate
  (2) Butyl acrylate
  (3) Dicyclopentadienyl methacrylate
under nitrogen.

(e) Heat the reactor to 60° C. and purge with nitrogen. Add 18 ml of the sodium metabisulfite solution and 10 ml of the initiator solution to the reactor. Start addition of the monomer blend after initial portion of redox system is charged.

(f) The polymerization is to be conducted at 65°–70° C.

(g) Add the monomer blend over 4–5 hours and the redox system, a portion, every 10 minutes over a period of time one hour longer than used to charge monomers.

(h) Hold at 70° C. an extra 30 minutes after all materials are charged to reactor.

(i) Cool and filter latex, under nitrogen.

The latex has 53.5% solids and yields a clear film. The air cured film is flexible and insoluble in MEK.

EXAMPLE 6

The following recipe and procedure describes the preparation of a styrene acrylic latex containing air curing monomer.

| Formulation | Weight Weight in grams | % by Weight Total Monomers |
|---|---|---|
| Styrene | 175 | 35 |
| Butyl acrylate | 175 | 35 |
| 2-Ethyl hexyl acrylate | 45 | 9 |
| Ethyl acrylate | 75 | 15 |
| Dicyclopentadienyl methacrylate | 30 | 6 |
| | 500 | 100 |
| Sodium Tridecyl ether sulfate (30%) | 28.6 | |
| Octylphenol ethoxylate (70%) | 13.0 | |
| Sodium persulfate | 1.25 | |
| Sodium bisulfite | 1.25 | |
| Water, deionized | 410 | |

PROCEDURE (a) Blend the styrene, butyl acrylate, 2-ethyl hexyl acrylate, ethyl acrylate and dicyclopentadienyl methacrylate together by stirring together under a nitrogen blanket. Prepare a solution of the surfactants in 150 ml of water. Form a pre-emulsion by stirring the monomer blend into the surfactant solution with vigorous agitation under a nitrogen blanket. Transfer this pre-emulsion to an additional funnel.

(b) To a 1 liter, stirred, polymerization reactor charge 220 ml of water and the sodium persulfate and stir until solution is formed.

(c) Dissolve the sodium metabisulfite in the remaining water and transfer this solution to an addition funnel.

(d) Purge the reactor with nitrogen and heat to 50° C.

(e) When the reactor reaches 50° C., charge 5 ml of the sodium metabisulfite solution.

(f) When the 5 ml of the sodium metabisulfite solution has been charged to the reactor, start the addition of the pre-emulsion to the reactor while stirring and holding the temperature at 60°–65° C. and adding sodium metabisulfite solution as needed.

(g) When all of the pre-emulsion has been charged, in 3–3½ hours, add any remaining sodium metabisulfite solution and continue heating for an additional 30 minutes.

(h) Cool and discharge latex.

The latex obtained had a solids content of about 55% and contained about 6% of dicyclopentadienyl methacrylate based on polymer formed. A second latex, Example 7, was prepared according to Example 6, except that the dicyclopentadienyl methacrylate was omitted and replaced by an additional 30 g. (6% on monomers charged) of 2-ethyl hexyl acrylate.

Three mil wet films were cast from these latex on glass plates and allowed to air dry. Films were prepared both with and without a naphthenate drier (3% based on resin solids). Films aged for varying times at room temperature were tested for cure by rubbing across them with a cotton cloth saturated with MEK. The number of rub cycles required to remove the film from the glass plate is taken as a measure of solvent resistance or degree of cure of the film. The results are tabulated below.

Development of Solvent resistance in Latex containing Dicyclopentadienyl Methacrylate

| % Dicyclo-pentadienyl methacrylate | Latex | Dryer | MEK Rub Cycles Passed | | |
|---|---|---|---|---|---|
| | | | 24 hrs. | 168 hrs. | 336 hrs. |
| 0 | Ex. 7 | None | 10–12 | 10–12 | 10–12 |
| 0 | Ex. 7 | Hydro-cure | 10–12 | 10–12 | 10–12 |
| 6 | Ex. 6 | None | 10–12 | 15 | 20 |
| 6 | Ex. 6 | Hydro-cure | 10–12 | 18–20 | 33 |

It is also of significance to note differences in the way in which the films failed. Films prepared from the latex of Example 7 failed by dissolution of the film into the MEK solvent. Films prepared from the latexes of Example 6 failed by checking, cracking and tearing of the film, which is typical of cured systems.

It will be understood that the foregoing specific examples are illustrative only of certain preferred embodiments of the present invention and that various modifications, which will suggest themselves to those skilled in the art, may be made therein without departing from the spirit of the invention or the scope of the appended claims.

Thus the butyl acrylate and methyl methacrylate employed as the major monomer components in the formulations used in the above examples were selected as typical of the lower alkyl esters of acrylic and methacrylic acids frequently used in the production of latices intended for use in coatings, paints and like applications. Numerous other formulations employing one, and frequently a blend of several, lower alkyl esters of acrylic and/or methacrylic acid as the sole or principal monomer component are known in the art and may be used as the major monomer component in practising the present invention. The lower alkyl acrylates and/or methacrylates are generally preferred, particularly from a cost standpoint, and therefore the lower alkyl acrylates and methacrylates in which the alkyl group contains from 1 to 4 carbons are preferred as the major monomer component(s) for use in this invention. Methyl acrylate, methyl methacrylate, ethyl acrylate, ethyl methacrylate, propyl acrylate, propyl methacrylate, butyl acrylate and butyl methacrylate, or a blend of two or more of them are thus particularly preferred as the major monomer component(s) and preferably constitute from about 75% to about 99% by weight of the total monomers used in the case of an all acrylic latex. However, higher alkyl acrylates and methacrylates, i.e., those in which the alkyl group(s) contain from 5 to about 18 carbons may be used if desired, and in fact may be desirable for some applications, especially when blended with a major proportion of one or more lower alkyl acrylates and/or methacrylates. As examples of higher alkyl acrylates and methacrylates which may be used may be mentioned, hexyl acrylate, hexyl methacrylate, ethylhexyl acrylate, ethylhexyl methacrylate, n-octyl acrylate, n-octyl methacrylate, lauryl acrylate, lauryl methacrylate, oxotridecyl acrylate, oxotridecyl methacrylate, stearyl acrylate, stearyl methacrylate, and the like.

While foregoing alkyl acrylates and alkyl methacrylates, including mixtures or blends of several of them, are preferred as the major acrylic type monomer which is copolymerized with cyclopentadienyl acrylate or cyclopentadienyl methacrylate and possibly a minor amount of acrylic acid or methacrylic acid; other acrylic type monomers such as acrylamide, methacrylamide, N-(1,1-dimethyl-3-oxobutyl acrylamide (also called diacetone acrylamide) and described in U.S. Pat. No. 3,497,467 of Feb. 25, 1970 to Coleman, acrylonitrile, and methacrylonitrile are readily copolymerized with dicyclopentadienyl acrylate and dicyclopentadienyl methacrylate, acrylic acid, methacrylic acid and alkyl acrylates and methacrylates, the preferred monomers employed in practising the present invention, and substantial amounts of such other acrylic monomers may be incorporated in the mixture of monomers used for producing the novel air-curing latices of this invention. if such other acrylic type monomers are used, they are preferably used as modifiers or extenders of the alkyl acrylate(s) or alkyl methacrylate(s) and in an amount, by weight, not greater than the amount of alkyl acrylate and/or alkyl methacrylate used.

While the preferred latices of the present invention are those derived solely from acrylic type monomers, other monoethylenically unsaturated monomers which are copolymerizable with the preferred acrylic type monomers may be incorporated in the mixture of monomers employed in practising the present invention. If used, such other monoethylenically unsaturated monomers are preferrably employed to impart special properties to the latex and films therefrom. As examples of specific monomers which may be so used may be mentioned: vinyl acetate, vinyl propionate, vinyl butyrate, vinyl chloride, vinyl methyl ketone, styrene, methoxy styrene, monochlorostyrene, ar-methylstyrene, ar-ethylstyrene, α, ar-dimethylstyrene, ar, ar-dimethylstyrene, vinylnaphthalene, vinyl benzoate, ethyl vinyl ether, n-butyl vinyl ether, isobutyl vinyl ether and the like. When such other monoethylenically unsaturated comonomers are used they may be used in amount of at least about 5% up to about 85% by weight of the total monomers; in the case of vinyl acetate a preferred range is from about 70% to about 80% and in the case of styrene from about 30% to about 45% by weight of the total monomers.

As previously indicated dicyclopentadienyl acrylate may be used in place of, or in admixture with, dicyclopentadienyl methacrylate which was employed in the foregoing specific examples.

The novel air-curing copolymer of the latices of the present invention is thus the copolymer of

| % by weight (based on total weight of all monomer components used) | Monomer component |
|---|---|
| about 1% to about 20% | (a) dicyclopentadienyl acrylate or |

| % by weight (based on total weight of all monomer components used) | Monomer component |
|---|---|
| | dicyclopentadienyl methacrylate; |
| about 99% to about 20% | (b) alkyl acrylate or alkyl methacrylate in which the alkyl groups contain 1 to 4 carbon atoms; |
| 0% to about 5% | (c) acrylic acid or methacrylic acid |
| 0% to about 40% | (d) other mono-acrylic type monomers, e.g. higher alkyl acrylates or methacrylates in which the alkyl groups contain from 5 to 18 carbon atoms, acrylamide, methacrylamide, diacetone acrylamide, acrylonitrile or methacrylonitrile; and |
| 0% to about 80% | (e) other monoethylenically unsaturated monomers which are copolymerizable with (a), (b), (c), and (d). |

The copolymerization reaction may be catalyzed by any of the free radical polymerization catalysts commonly used in the emulsion polymerization of acrylic monomers. Typical catalysts include MEK peroxide (methyl ethyl ketone peroxide), lauroyl peroxide, t-butyl peroctoate, benzoyl peroxide, isopropyl percarbonate, azobisiso-butyronitrile, cumene hydroperoxide, dicumyl peroxide, potassium or sodium peroxide, potassium or sodium persulfate and other inorganic or organic peroxides. Irradiation, as by ultraviolet light or gamma rays, also can be used to catalyze the copolymerization. Such catalysts are normally employed in the range of about 0.05 to about 4%, by weight of the total monomers. The preferred amount of catalyst is about 0.1 to about 2.0% of the monomer components.

The emulsification of the monomers may be effected by the use of well known surfactant emulsifiers commonly used in acrylic emulsion polymerizations. Examples of typical surfactant emulsifiers which may be used include: sodium lauryl sulfate, sodium lauryl ether sulfate, sodium tridecyl sulfate, sodium tridecyl ether sulfate, sodium dodecyl sulfonate, sodium oleyl isethionate, dioctyl sodium sulfosuccinate, sodium N-cyclohexyl N- palmitoyl taurate, the polyglycol ether derivatives obtained by ethoxylation of higher fatty acids, fatty alcohols or alkyl phenols, also the sulfate esters of such ethoxylates. There may also be used copolymerizable surfactants such as the esters of acrylic acid or methacrylic acid with hydroxyalkane sulfonic acids, e.g. 2-sulfo ethyl acrylate and 2-sulfoethyl methacrylate, etc. disclosed in U.S. Pat. No. 3,024,221 to Lefevre and Sheetz or the sulfate or phosphate esters of hydroxyalkyl esters of acrylic and methacrylic acid disclosed, respectively, in U.S. Pat. Nos. 3,839,393 and 3,855,364 both to Steckler.

When a drying agent is incorporated in the air-curing latices of the invention, there may be used any of the drying agents (driers) commonly used with "drying oils" such as those described in the Encyclopedia of Chemical Technology, Kirk-Othmer, Vol. 5, pages 195-205, Interscience Publishers, New York (1950). These include various salts of such polyvalent metals as copper, zinc, lead, cobalt and manganese. The simple salts of these metals such as the halides, nitrates and sulfates may be used; but salts of organic acids such as fatty acids, e.g. acetic acid, butyric acid and especially higher fatty acids such as octoic acid, lauric acid, oleic acid, stearic acid, etc. are usually preferred. The salts of naphthenic acids, especially the cobalt and/or manganese naphthenates are frequently preferred. Salts of abietic and other resin acids such as Tall Oil acids are also used. Mixtures of several drying agents are commonly used. A number of commercially available drying agents and their suppliers are listed in Modern Paint and Coatings of February 1977, pages 26 and 27; of these we particularly prefer the water dispersible types listed on page 27, available under the trade names Cem-All and hydro-Cure from Mooney Chemicals, Inc., Cleveland, Ohio; HED from Ferro Corp., Bedford, Ohio; and Intercar from Interstab Chemicals, Inc., New Brunswick, N.J.

The novel air-curing latices of the present invention are particularly valuable for use in coating applications and especially in the formulation of acrylic latex paints. Thus for use in paints the novel latices of the present invention may be compounded with pigments and other additives commonly used in acrylic latex paint formulations. Typical pigments so used and which are compatible with the latices of this invention are Titanium dioxide (rutile) and barytes (both of which may be compounded with 5-10% of zinc oxide to control yellowing; as coloring pigments there may be used iron oxide red, browns and yellows; phthalocyanine blue and green; Hansa Yellow; Toluidine Red; and lamp Black. Extender pigments such as calcium carbonate, silica, talc and coprecipitated 30%-50% titanium dioxide with 70%-50% calcium sulfate are also frequently used. Typical pigment content of acrylic latex paints range from about 30% for exterior paints to about 55-70% for interior paints. Other conventional additives for such paint formulations are: Dispersing agents for the pigments, such as tetrasodium pyrophosphate, soya lecithin, alkyl aryl sulfonates; Protective colloids and thickeners such as sodium polyacrylates, CMC, hydroxyethyl cellulose, colloidal clays and gum arabic; Defoamers such as tri-n-butyl phosphate, n-octyl alcohol and other higher alcohols; Coalescing agents such as hexylene glycol and ethylene glycol monobutyl acetate; FreezeThaw additives usually ethylene glycol; and Mildewicides and Preservatives such as mercurial, copper and phenolic compounds. A typical paint formulation is as follows:

| A. Pigment Slip | | | B. Polymer Latex | | |
|---|---|---|---|---|---|
| | lbs. | gals. | | lbs. | gals. |
| Dispersing agent (alkylaryl sulfonate) | 15 | 2.0 | Acrylic latex (40% resin solids) | 605 | 68.9 |
| Defoamer (octyl alcohol) | 2 | 0.2 | Preservative | 9 | 1.0 |

-continued

| A. Pigment Slip | | | B. Polymer Latex | | |
|---|---|---|---|---|---|
| | lbs. | gals. | | lbs. | gals. |
| Water | 50 | 6.0 | Defoamer | 2 | 0.2 |
| Titanium dioxide | 250 | 7.2 | Water | 8 | 1.0 |
| Extender pigments | 117 | 5.0 | Ammonium hydroxide (as needed) | 1 | 0.1 |
| Hydroxyethyl cellulose (20% aqueous solution) | 50 | 6.0 | | | |
| Ethylene glycol | 25 | 2.6 | | | |
| Total | 509 | 29.0 | | 625 | 71.2 |

The Pigment Slip A is prepared with thorough mixing and milling and the Polymer Latex B is prepared by thorough mixing of its ingredients. The Pigment Slip is then thoroughly blended into the Polymer Latex by thorough mixing and milling to insure a uniform dispersion. The finished paint should be stored in tightly closed, well filled containers under an inert atmosphere. Latex paints, so prepared with the use of the air-curing acrylic latices Ex. 1, Ex. 2 and Ex. 3 dry to a tack-free state in essentially the same time as those prepared from corresponding acrylic latices which contained no dicyclopentadienyl acrylate or dicyclopentadienyl methacrylate. However, the paint films produced by paints in which the novel air-curing latices of this invention were used continued to air-cure on standing in air, as evidenced by their increasing resistance to solvents such as MEK, in a manner comparable to that of the films prepared from latices Examples 1–6 per se; while no such air-curing was noticeable in the paint films from paints in which a corresponding acrylic latex which contained no air-curing monomer component had been used.

We claim:

1. An air-curing copolymer latex comprising an aqueous dispersion of a copolymer of a mixture of copolymerizable monomers, consisting essentially, in % by weight based on the total weight of monomers used, of:
    (a) about 1% to about 20% of dicyclopentadienyl acrylate or dicyclopentadienyl methacrylate;
    (b) about 99% to about 20% of an alkyl acrylate or alkyl methacrylate, including mixtures thereof, in which the alkyl groups contain from 1 to 4 carbon atoms;
    (c) about 0% to about 5% of acrylic acid or methacrylic acid;
    (d) about 0% to about 40% of other acrylic monomers selected from the group consisting of higher alkyl acrylates and alkyl methacrylates in which the alkyl groups contain from 5 to 18 carbon atoms, acrylamide, methacrylamide, diacetone acrylamide, acrylonitrile and methacrylonitrile; and:
    (e) about 0% to about 80% of other monoethylenically unsaturated monomers which are copolymerizable with (a), (b), (c) and (d);
the above comonomers constituting essentially 100% by weight of the total monomers in said copolymer.

2. An air-curing acrylic copolymer latex as defined in claim 1, wherein the copolymer specified consists essentially of a copolymer of:
    (a) about 1% to about 10% of dicyclopentadienyl acrylate or dicyclopentadienyl methacrylate;
    (b) about 99% to about 75% of an alkyl acrylate or alkyl methacrylate, including mixtures thereof, in which the alkyl groups contain from 1 to 4 carbon atoms; and
    (c) about 0% to about 5% of acrylic acid or methacrylic acid.

3. An air-curing copolymer latex as defined in claim 1, wherein the copolymer specified has a content in the range of from about 3% to about 10% of dicyclopentadienyl acrylate or dicyclopentadienyl methacrylate.

4. An air-curing vinyl acetate-acrylic copolymer latex as defined in claim 1 wherein the copolymer specified has a content in the range of from about 5% to about 80% of vinyl acetate.

5. An air-curing vinyl acetate-acrylic copolymer latex as defined in claim 3 wherein the copolymer specified has a content in the range of from about 5% to about 80% of vinyl acetate.

6. An air-curing styrene-acrylic copolymer latex as defined in claim 1 wherein the copolymer specified has a content in the range of from about 5% to about 70% of styrene.

7. An air-curing styrene-acrylic copolymer latex as defined in claim 3 wherein the copolymer specified has a content in the range of from about 5% to about 70% of styrene.

8. The process of producing an air-curing copolymer latex as defined in claim 1 which comprises forming a mixture of monomers consisting essentially, in % by weight based on the total weight of all monomers used, of:
    (a) about 1% to about 20% of dicyclopentadienyl acrylate or dicyclopentadienyl methacrylate;
    (b) about 99% to about 20% of an alkyl acrylate or alkyl methacrylate, including mixtures thereof, in which the alkyl groups contain from 1 to 4 carbon atoms;
    (c) about 0% to about 5% of acrylic acid or methacrylic acid;
    (d) about 0% to about 40% of other acrylic monomers selected from the group consisting of higher alkyl acrylates and alkyl methacrylates in which the alkyl groups contain from 5 to 18 carbon atoms, acrylamide, methacrylamide, diacetone acrylamide, acrylonitrile and methacrylonitrile; and
    (e) about 0% to about 80% of other monoethylenically unsaturated monomers which are copolymerizable with (a), (b), (c) and (d);
the above comonomers constituting essentially 100% by weight of the total monomers in said copolymer; emulsifying said comonomers in water in the presence of a surfactant emulsifier therefor; and effecting copolymerization of said comonomers in the thus formed emulsion in the presence of a free radical polymerization catalyst.

* * * * *

UNITED STATES PATENT AND TRADEMARK OFFICE
CERTIFICATE OF CORRECTION

PATENT NO. : 4,144,212
DATED : March 13, 1979
INVENTOR(S) : Seymour M. Linder and John W. Calentine It is certified that error appears in the above–identified patent and that said Letters Patent are hereby corrected as shown below:

Column 3, line 2, "field" should read -- yield --.
Column 4, between lines 51 and 52, add the following lines to the table giving the formulation,

| | |
|---|---|
| "Sodium Tridecyl Ether Sulfate (30%active) | 32.6 |
| Octylphenol ethoxylate (70%active) | 14.9 |
| Sodium Persulfate | 1.4 |
| Sodium Metabisulfite | 1.4 |
| Water, deionized | 381.8 |
| Total | 1,000.94 |

(1) the air curing monomer (Dicyclopentadienyl Methacrylate) and latices containing it should be stored under nitrogen"

Column 5, line 22, "preemulsifier" should read -- pre-emulsion --.
Column 14, line 64 and Column 15, line 3 in the heading of the table "gals.", first occurrence, should appear over the second column of figures.

Signed and Sealed this

Seventeenth Day of July 1979

[SEAL]

Attest:

LUTRELLE F. PARKER

Attesting Officer   Acting Commissioner of Patents and Trademarks

REEXAMINATION CERTIFICATE (70th)

United States Patent [19]

Linder et al.

[11] B1 4,144,212

[45] Certificate Issued Apr. 5, 1983

[54] AIR-CURING COPOLYMER LATICES

[75] Inventors: Seymour M. Linder, Baltimore; John W. Calentine, Pasadena, both of Md.

[73] Assignee: Alcolac Inc., Baltimore, Md.

Reexamination Request

No. 90/000,012, Jul. 1, 1981

Reexamination Certificate for:
Patent No.: 4,144,212
Issued: Mar. 13, 1979
Appl. No.: 883,505
Filed: Mar. 6, 1978

Certificate of Correction issued Jul. 17, 1979.

[51] Int. Cl.$^3$ .............................................. C08F 20/40
[52] U.S. Cl. ... 524/818; 524/820; 524/823; 524/833; 526/282
[58] Field of Search ........................................ 524/818

[56] References Cited

U.S. PATENT DOCUMENTS 2,462,400  2/1949  Hoover ............................ 260/84
4,100,133  7/1978  Emmons et al. ................. 260/45.9

OTHER PUBLICATIONS

Berry, et al., "New Comonomer for Preparing High Performance, Sulfur Curable Acrylic Rubbers," *Rubber World*, June 1974, p. 42, et seq.

*Primary Examiner*—Paul R. Michl
*Attorney, Agent, or Firm*—Finnegan, Henderson, Farabow, Garrett & Dunner

[57] ABSTRACT

Air-curing copolymer latices are described. The preferred copolymer latices are prepared by emulsion copolymerization, in the presence of a free radical polymerization catalyst such as inorganic or organic peroxide polymerization catalysts, with a blend (in % by weight based on the total weight of all monomers used) of (a) about 1% to about 20% of dicyclopentadienyl acrylate or dicyclopentadienyl methacrylate, (b) about 99% to about 20% of an alkyl acrylate or methacrylate, including mixtures of such monomers, and preferably a lower alkyl acrylate or methacrylate in which the alkyl groups contain from 1 to 4 carbon atoms, (c) 0% to about 5% of acrylic acid or methacrylic acid, and (d) 0% to about 85% of other monoethylenically unsaturated copolymerizable monomers. As examples of other copolymerizable monomers which may be used as component (d) may be mentioned: higher alkyl acrylates and methacrylates in which the alkyl groups contain from 5 to about 18 carbon atoms, acrylamide, methacrylamide, acrylonitrile or methacrylonitrile; also vinyl esters (e.g. vinyl acetate, vinyl propionate of vinyl chloride), styrene and alkyl vinyl ethers. The novel air-curing latices of the present invention are particularly suitable for use in paints and other coating applications since the films obtained therefrom continue to cure on standing in air, as evidenced by a marked increase in their resistance to solvents, such as methyl ethyl ketone. The cure can be accelerated to a significant degree by heating the films and/or by incorporating a few percent of a drying agent in the latex.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

Claims 1-8 having been finally determined to be unpatentable, are cancelled

* * * * *